318-135. SR
06-06-72 XR 3,668,443

United States Patent [15] 3,668,443
Schwartz [45] June 6, 1972

[54] MAGNETIC INCREMENTING DETENT

[72] Inventor: Samuel A. Schwartz, Los Altos, Calif.
[73] Assignee: Data General Corporation, Southboro, Mass.

[22] Filed: May 17, 1971
[21] Appl. No.: 144,164

[52] U.S. Cl.....................................310/12, 310/13, 318/135
[51] Int. Cl........................................................H02k 41/02
[58] Field of Search............................310/12, 13, 14, 15, 16; 318/135, 38; 335/268; 346/29

[56] References Cited

UNITED STATES PATENTS

| | | | |
|---|---|---|---|
| 3,376,578 | 4/1968 | Sawyer | 318/135 X |
| 3,219,853 | 11/1965 | Schreiber | 310/14 |
| 3,268,747 | 8/1966 | Snowdon | 310/13 |

*Primary Examiner*—J. D. Miller
*Assistant Examiner*—B. A. Reynolds
*Attorney*—Townsend and Townsend

[57] ABSTRACT

A multiphase magnetic incrementing drive for rapidly moving a magnetic head toward and away from the center of a magnetic information storage disc in very small yet precisely controllable and consistently reproducible increments. A movable member carrying the head is slideably mounted above a stationary member by an air bearing and both members are provided with juxtaposed magnetic coupling surfaces. At least three magnetic areas, each having pole pieces in relative phase differential to those in other areas are integrally formed on one of the magnetic surfaces in a geometrically balanced arrangement to equalize the magnetic driving forces with respect to bearing loads.

20 Claims, 5 Drawing Figures

Figures 1A, 1B, 1C:
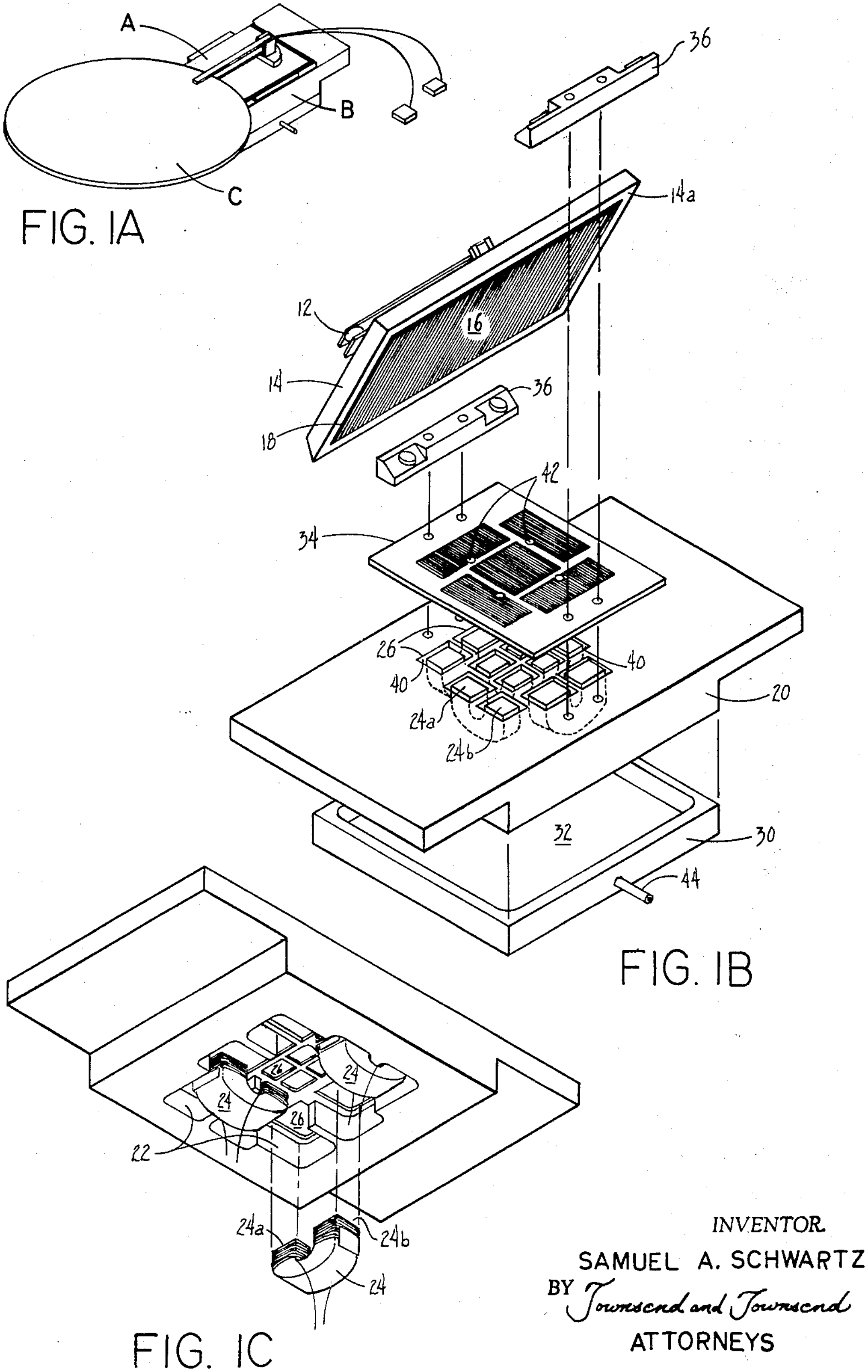

INVENTOR.
SAMUEL A. SCHWARTZ
BY Townsend and Townsend
ATTORNEYS

INVENTOR.
SAMUEL A. SCHWARTZ
BY Townsend and Townsend
ATTORNEYS

MAGNETIC INCREMENTING DETENT

The magnetic drive of the present invention has application in any situation requiring rapid relative linear motion between two elements in small but precise increments of distance. According to a preferred embodiment of the invention, the drive is utilized in connection with magnetic recording discs commonly employed as information storage units in modern data processing systems. In such systems it is imperative to quickly and accurately address a particular track on the disc surface so that magnetic information may be stored at, or read from that radial location.

The present invention provides a means of bringing the read-write head from any radial position on the disc to the addressed track in a minimum amount of time. In addition the head can be stopped directly over the desired track without any compensation adjustment as required with some conventional systems which have a tendency to undershoot or overshoot the target. The operation of the present drive unit can be analogized to a mechanical detent which stops a moving carriage directly and positively at the desired position.

The importance of the capability to quickly and accurately index the head directly over the desired track arises from the fact that the disc surface has an available recording area having a radius of only a few inches and that within this annular area upwards of 200 tracks may be located.

The invention achieves its driving force from magnetic coupling between a stationary element, hereinafter referred to as the base, and a movable element designated the carriage. The magnetic coupling is produced by a novel variation of the multiphase systems of magnetic drive which are well known to those skilled in the art of linear incrementing motors. Under these systems three or more separate driving currents are sequentially applied to a like number of sets of electromagnets, usually arranged in pairs. By selectively energizing the magnets of each set in the appropriate sequence, bidirectional linear movement of the carriage is produced.

The magnetic forces between the stationary and movable elements in such a system can be resolved into components normal to the magnetic surfaces and parallel to the surfaces, specifically in the direction of carriage movement. The normal forces attract the base and carriage toward one another while the tangential forces produce the desired movement of the carriage with respect to the base. The former forces will be referred to as attractive and the latter forces propulsive. With respect to each of these two force components, attractive and propulsive, the prior art has recognized the desirability of minimizing or eliminating any imbalance of forces which tends to produce a net torque on the carriage either in the plane of the magnetic drive surfaces or normal to these surfaces. In the case where carriage movement is restrained to a one-dimensional linear path, the torques of the former description have the effect of producing friction drag at the points of contact between the restraining means and the carriage. The normal torques on the other hand have the effect of causing one portion of the magnetic surface of the carriage to be drawn closer to the magnetic surface of the base, thus creating a non-uniform spacing between the two elements.

The prior art has sought to eliminate these undesirable torques by disposing each of the three or more magnet sets in spaced pairs and so arranging the magnet pairs that when any pair is energized the resultant forces are evenly distributed with respect to the magnetic surface of the moving element.

One example of a three-phase system employed by prior art devices utilizes two groups of three magnets each. One magnet in each group has a common electrical connection with a corresponding magnet in the other group. Thus, electrically there are three sets of magnet pairs. The magnet pair which comprises each set are spaced apart in equal distance from the longitudinal center axis of the movable magnetic surface, and are diagonally symmetrical about that axis. Such a system is disclosed in U.S. Pat. No. 3,376,578, issued to Sawyer. The prior art systems however exhibit the common limitation that no magnetic force is generated from the central portion of the magnetic driving surface.

In multiphase systems the spacing between the groups of pole pieces associated with the different magnet sets is critical in order to provide the relative phase differential necessary for generation of the magnetic driving forces. This in turn requires precise alignment of the magnets during the assembly process since the pole pieces are conventionally formed integral with the individual pole faces of the magnets. Any error in positioning the magnets with respect to one another will distort the required phase differential thereby adversely affecting the operation of the drive unit.

Accordingly, it is an object of the present invention to provide a new and improved magnetic linear incrementing drive which balances the magnetic drive forces on the movable element while at the same time more effectively utilizes the total magnetic surface area for coupling.

It is a further object of the present invention to provide a design whereby the correct phase alignment of the various magnetic areas is obtained by means of a relatively simple and yet highly accurate fabrication technique.

Figure 2:
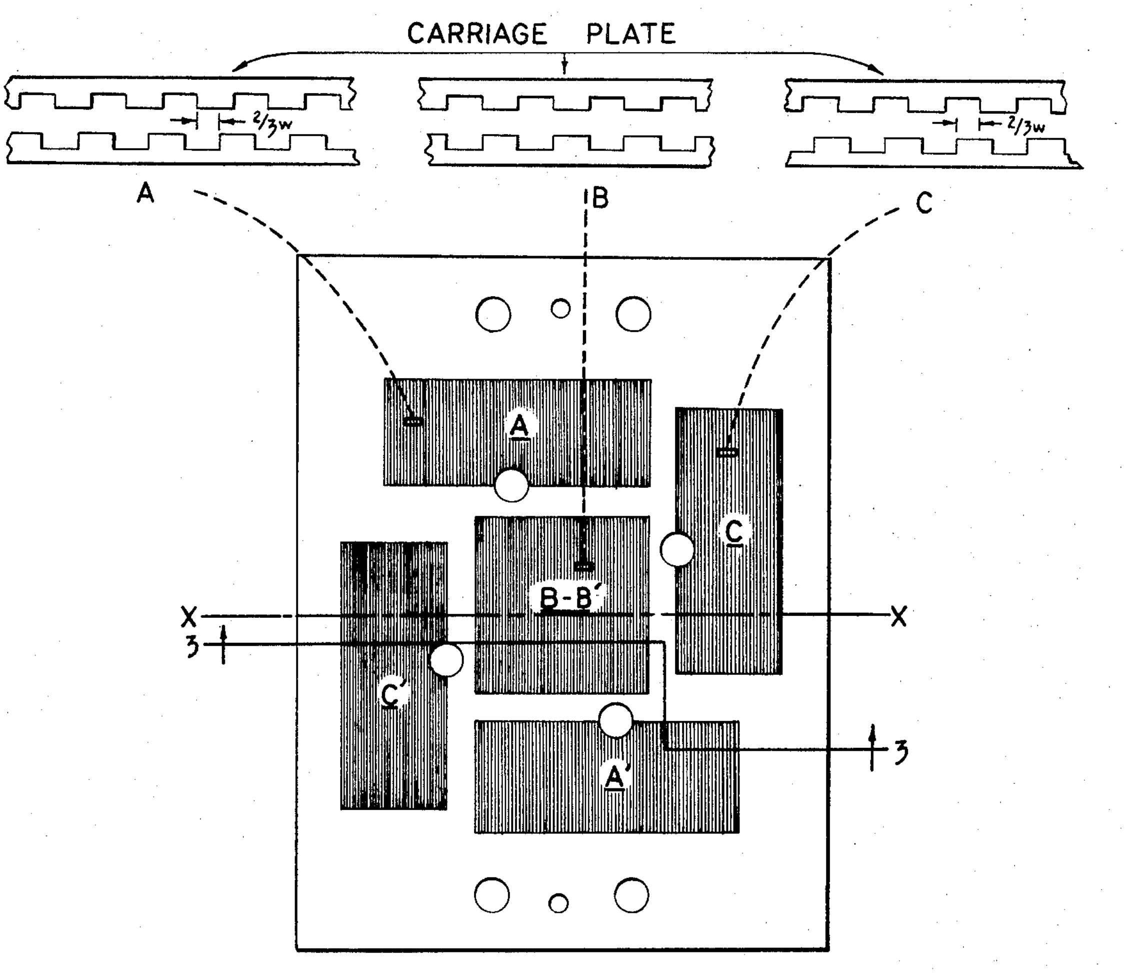
Figure 3:
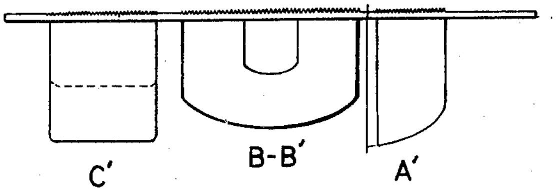

These and other objects, features and advantages of the present invention will be more readily apparent from the following detailed description with reference to the accompanying drawings wherein:

FIG. 1*a* is a perspective view of a preferred embodiment of the magnetic drive of the present invention and an associated magnetic recording disc;

FIG. 1*b* is an exploded perspective view of the magnetic drive of FIG. 1 illustrating the basic components thereof;

FIG. 1*c* is a perspective view of the underside of the drive unit with the cover and several magnets removed;

FIG. 2 is a diagrammatic representation of the relative geometries of the magnetic coupling surfaces of the moving and stationary elements of the present invention illustrating the mechanism by which the magnetic driving forces are generated; and, FIG. 3 is a sectional view of the base plate and attached magnets taken along line 3—3 of FIG. 2.

Referring now to the views of FIG. 1, the present invention comprises two major assemblies: a carriage assembly A, and a base assembly B. FIG. 1*a* also shows a magnetic recording disc C, with which the drive unit is used. A magnetic read-write head 12 is mounted on carriage 14 which has a planar surface **14*a*. Attached to this lower surface is a plurality of parallel, equally spaced magnetic pole pieces 16 of similar dimension, cross-section, and spacing. The pole pieces are made from a suitable magnetic material such as iron, and together comprise the magnetic driving surface of the carriage. In the embodiment shown in FIG. 1 the individual pole pieces are integrally formed on a single carriage plate 18**. The carriage plate has etched into its surface a series of parallel equally spaced lands and grooves whose cross-section provides the required pole piece profile as most clearly shown in the upper part of FIG. 2. Alternatively the pole pieces may be fabricated directly on the lower surface of the carriage itself. This approach however necessitates forming the entire carriage from a suitable magnetic material which presents certain disadvantages in terms of increased weight and inertia.

The base assembly B comprises a base 20 having a plurality of walled recesses 22 formed on the underside thereof. These recesses 22 slideably receive electromagnets 24 each of which consists of a U-shaped core having two pole faces **24*a* and 24*b* and a current carrying wire wound about the core. Walled recesses 24 terminate at the upper surface of the base in a plurality of apertures 26 so positioned that when the magnets are introduced into recesses 22, the magnet pole faces 24*a* and 24*b*** protrude through and slightly above the upper surface of the base so as to be exposed.

A cover 30 is attached to the bottom surface of the base. This cover is so formed that when the base and cover are assembled a chamber 32 is defined between the two elements which functions as an air manifold for the air bearing system to be described hereinafter.

The magnetic driving surface of the base assembly is formed by etching a pattern of parallel, equally spaced lands and grooves into one surface of a base plate 34. This base plate is made of a magnetic material and is mounted on the upper surface of the base 20 so that the lands and grooves are disposed upwardly toward the downwardly facing lands and grooves on carriage plate 18. Also, the lands and grooves on the adjacent plates 18 and 34 all extend in the same direction, transverse to the path of carriage movement. The lands and grooves on both plates may be formed by various conventional methods of photo-etching which are well known to those skilled in the art to which this invention pertains.

The lands and grooves integrally formed in the surface of the base plate 34 comprise three magnetic areas which are positioned to coincide with the corresponding magnet pole faces 24*a* and 24*b* contacting the other side of plate 34. By forming the lands and grooves which make up the pole pieces of the various magnetic areas on a single plate, the process of assembling the disc drive of the present invention is greatly simplified over that associated with conventional devices of this nature for reasons to be discussed hereinafter.

Ball bearing guide means 36 are mounted on the base and positioned to restrain the movement of the carriage to a linear path toward and away from the center of magnetic information storage disc C with which the drive unit of the present invention is used.

When current pulses are applied to the sets of electromagnets in the proper sequence the relative geometries of the carriage pole pieces 16 and the base pole pieces formed by the lands and grooves of base plate 34 produce linear movement of the carriage 14 in the following manner. Referring to the three-phase system shown in FIG. 2, the magnets are electrically connected in three sets of two magnets each, with one magnetic area on the opposite side of base plate 34 in registration with a corresponding magnet set. The magnet pair comprising each set has a common electrical connection. In FIG. 2 the three sets of magnet pairs and the three associated magnetic areas are designated A–A′, B–B′, and C–C′. For a four-phase system the magnets and corresponding magnetic areas would be arranged in four sets, with each set having two or more magnets, and so on.

The magnetic area corresponding to magnet set A–A′ comprises two segments A and A′ which are spaced from one another and have their individual centers of area equidistant from and diagonally symmetrical about the longitudinal center axis of base plate 34, line X—X. The term longitudinal center axis as used herein refers to a line passing through the center of base plate 34 and extending in the direction of carriage movement. This line, X—X, is likewise the longitudinal center axis of the carriage plate 18 since the carriage 14 is centered over the base plate by guide means 36.

Similarly the magnetic area associated with magnet set C–C′ comprises two spaced segments C and C′ which are equidistant from and diagonally opposed about the longitudinal center axis of base plate 34, line X—X. The spacing of the segments comprising these two magnetic areas serves to balance the magnetic forces about line X—X to eliminate any net torque on the carriage 14 in the plane of carriage plate 18. Such torque would tend to rotate carriage 14 against ball bearing guide means 36 and produce friction drag at the point of contact.

Lastly and most importantly the magnetic area B–B′ associated with magnet set B–B′ is not divided into spaced segments but instead comprises a single area centrally located with respect to the magnetic surfaces. In other words, the center of area B–B′ is at all times in registration with the longitudinal center axis of the base and carriage magnetic surfaces. Obviously in such a case the resultant magnetic propulsive force from magnetic area B–B′ cannot produce a net torque about line X—X. This arrangement allows utilization of substantially the entire area of the magnetic driving surfaces for coupling while equalizing the magnetic driving forces with respect to the bearing loads on carriage 14.

Since the central magnet set B–B is magnetically equivalent to a single centrally located magnet, the magnet pair can be replaced by a single magnet but the operation of the disc drive is the same in either case.

The mechanism by which the magnetic driving forces are generated may be more easily understood in reference to FIG. 2 wherein the relative geometries of base plate 34 and carriage plate 18 are illustrated. For purposes of clarity the portions of the three magnetic areas which have been chosen for enlargement in FIG. 2 do not overlap and are shown in an exploded side-by-side relationship in the cross-sectional view at the top of the Figure. It can be seen from the base plate plan view of the same Figure that certain portions of the respective magnetic areas do in fact overlap one another. Further, in the cases of the two magnetic areas disposed in spaced segments only one element of the pair is shown. That is, a portion of segments A and C have been shown but not segments A′ and C′. No loss in understanding should result from this omission since the lands and grooves in each segment of a given magnetic area are in identical phase alignment.

Magnets 24 are mounted within base 20 in such a manner as to make intimate contact with the underside of base plate 34. This is desirable in order to achieve maximum magnetic flux flow from pole faces 24*a* and 24*b* of magnets 24 to the lands formed in the opposite side of base plate 34 which comprise the pole pieces of the base magnetic surface, by the elimination of any appreciable air gap therebetween.

It can be seen from FIG. 3 that the interpole gap between the two pole faces 24*a* and 24*b* of a given magnet 24 is bridged by the body of the base plate 34. If base plate 34 were too thick in cross-section across this gap, an undesirably large portion of the flux generated by electromagnets 24 would be shunted from one pole face 24*a* to the other pole face 24*b* through the section of base plate 34 spanning the pole faces. This would severely decrease the amount of flux which leaves the surface of base plate 34 opposite one pole face 24*a*, passes through the adjacent lands of carriage plate 18, and returns to pole face 24*b* through base plate 34. Since it is this flux which produces the magnetic forces responsible for the movement of carriage 14, the operation of the drive would be adversely affected.

The present invention takes advantage of the discovery that if the base plate 34 is of thin enough cross-section across the interpole gap, it will reach flux saturation thereby diverting only a small percentage of the total flux generated. In the particular embodiment shown in FIG. 1, the maximum thickness of the base plate 34 measured from its ungrooved surface to the top of a land on the opposite surface is 0.015 inch which is small enough to achieve the desired flux saturation.

The cross-sectional profile and dimensions of the lands and grooves forming the three magnetic areas on base plate 34 are identical both to each other and to the lands and grooves on carriage plate 18. In addition, as mentioned above, all lands and grooves both on carriage plate 18 and base plate 34 are parallel, extending in a direction transverse to the path of movement of carriage 14.

The magnetic driving forces are produced by the spacing between the three magnetic areas which results in a relative phase differential between the lands and grooves of the various magnetic areas. When the lands of one magnetic area are in alignment with the lands of carriage plate 18, the lands of each of the other two magnetic areas on base plate 34 will be displaced from direct alignment with the carriage plate lands by a different fractional multiple of the width of an individual land.

For example, as shown at the top of FIG. 2, if the width of a land is designated *w*, the pole pieces — i.e., the lands — in magnetic area segments A and A′ are phase-displaced a distance of two-thirds *w* toward the pole pieces in central magnetic area B–B′ which is to the right in FIG. 2. Similarly, the pole pieces in magnetic area segments C and C′ are phase-displaced a distance of two-thirds *w* away from the pole pieces in the central magnetic area B–B′ which is to the left in FIG. 2.

In operation, if the magnet set for the central magnetic area, B–B', is energized by a current pulse applied to the windings of the component electromagnets, the pole pieces in the central magnetic area will tend to align themselves with the pole pieces in carriage plate 18 in order to produce a minimum reluctance flux path. This phase condition is shown at the top of FIG. 2. If a current pulse is next applied to the magnet set associated with magnetic area segments C and C', the pole pieces in these segments will align with those of the carriage plate producing a relative displacement which moves the carriage a distance of two-thirds *w* to the left. At this point with the pole pieces of segments C and C' in phase with the carriage, the pole pieces in the central magnetic area B–B' will be two-thirds *w* out of phase to the right with respect to the carriage and the pole pieces in segments A and A' will be two-thirds *w* out of phase to the left. Thus, when any of the three magnetic areas is aligned with the carriage the other two areas will be two-thirds *w* out of phase with the carriage, one to the right and one to the left. If, in our example, we now apply a current pulse to the electromagnets associated with magnetic area segments A and A', the carriage will again move to the left a distance of two-thirds *w*.

From the above example, it can be seen that magnet energizing pulses in the sequence B–B', C–C', A–A', B–B', etc. will produce a stepping movement of the carriage to the left in increments of two-thirds *w*. In a like manner, the energizing sequence B–B', A–A', C–C', B–B' will result in a similar stepping motion of carriage 14 to the left in increments of two-thirds *w*. If the width of an individual land, *w*, is 0.015 inch, the stepping occurs in increments of 0.010 inch.

It should be noted that the present invention is not limited to the case where the magnets are included in the base assembly but is included to cover the embodiment where they are affixed to and travel with the carriage. In such a case the relative geometrics of the carriage plate and base plate are reversed but the operation is identical to that described above.

The spaces formed between electromagnets 24 and walled recesses 22 comprise a system of air passages represented in FIG. 1*b* as 40. Also base plate 34 includes a plurality of apertures 42 which communicate with air passages 40 in base 20. Air passages 40 communicate at the lower portion of the interior of base 20 with air chamber 32 formed between cover 30 and base 20 so that when a supply of air is introduced into chamber 32 under suitable pressure through pipe 44 it will flow upwardly through air passages 40 and base plate apertures 42 creating a cushion of air which "floats" carriage 14 above base 20 by producing a supporting force which opposes both the weight of carriage assembly A and the attractive magnetic forces generated between carriage assembly A and base assembly B. By varying the pressure of the air supply connected to pipe 44 the spacing between base plate 34 and carriage plate 18 can be adjusted as desired.

Other uses and advantages of the present invention will be apparent to those skilled in the art and although one embodiment of the invention has been shown and described it will be apparent also that other adaptations and modifications can be made without departing from the true spirit and scope of the invention.

What is claimed is:

1. In a multiphase magnetic linear incrementing drive having a movable element and a stationary element in spaced juxtaposition to one another, the improvement comprising a unitary magnetic driving surface on a first one of said elements having integrally formed thereon at least three magnetic areas, each of said areas comprising a plurality of parallel equally spaced lands and grooves extending in a direction transverse to the path of movement of said movable element, the lands and grooves in each of said areas being in relative phase differential with respect to the lands and grooves in each of the others of said areas, and a magnetic driving surface on the second of said elements comprising a plurality of equally spaced lands and grooves identical to and in parallel alignment with the lands and grooves of said first element, said magnetic surfaces being in spaced juxtaposition to one another.

2. Apparatus according to claim 1 wherein one of said magnetic areas is centrally disposed with respect to the magnetic surface of said movable element and the others of said magnetic areas each comprise at least two spaced segments having their centers of area equidistant from and diagonally symmetrical about the longitudinal center axis of said movable element.

3. Apparatus according to claim 2 wherein said magnetic areas are formed on one surface of a plate of magnetic material mounted on said first element in spaced juxtaposition to the magnetic surface of said second element.

4. In a magnetic linear incrementing drive having a movable element with a planar surface and a stationary element with a planar surface, said planar surfaces being in spaced juxtaposition to one another, the improvement comprising:

a. a plate affixed to a first one of said planar surfaces, said plate having integrally formed on one surface thereof at least three magnetic areas, each of said areas comprising a plurality of parallel, equally spaced lands and grooves extending in a direction transverse to the path of said movable member, the lands and grooves in each one of said magnetic areas being in relative phase differential to the lands and grooves in each one of the others of said magnetic areas;

b. at least three sets of electromagnets having pole faces contacting the opposite surface of said plate in registration and magnetic association with a different one of said magnetic areas, each of said sets having a common electrical connection;

c. means for selectively energizing each of said sets of electromagnets; and, d. air bearing means maintaining said movable member in floating spaced juxtaposition above said stationary member.

5. Apparatus according to claim 4 wherein said magnetic areas have a geometrical arrangement comprising: a first magnetic area having its center in registration with the longitudinal center axis of the magnetic surface of said movable member, second and third magnetic areas each comprising at least two spaced segments whose centers of area are equidistant from and diagonally symmetrical about said longitudinal center axis.

6. Apparatus according to claim 5 wherein the lands and grooves in registration with a particular one of said electromagnets span the pole faces thereof.

7. In a multiphase magnetic incrementing drive having a movable member slideably mounted above a stationary member for one-dimensional linear movement relative thereto, said members having magnetic coupling surfaces in spaced juxtaposition to one another, the improvement comprising:

a. a pair of magnetic plates disposed in spaced apart juxtaposition to one another, a first one of said plates mounted on the upper surface of said stationary member and having formed in its upper surface at least three magnetic areas, one of which is centrally located on said plate, each one of said areas comprising a plurality of parallel equally spaced lands and grooves extending in a direction transverse to the path of said movable member, the lands and grooves in each one of said magnetic areas being in relative phase differential to the lands and grooves in each of the other magnetic areas, the second of said plates mounted on the lower surface of said stationary member and having formed on its lower surface a plurality of lands and grooves identical to and in parallel alignment with the lands and grooves on said first plate;

b. at least three sets of electromagnets having pole faces contacting the lower surface of said first plate in magnetic association with a corresponding one of said magnetic areas; and, c. means for selectively energizing each of said sets of electromagnets.

8. Apparatus of claim 7 further comprising air bearing means for maintaining said movable member in floating spaced juxtaposition above said plate.

9. Apparatus of claim 7 wherein said magnetic areas have a geometrical arrangement comprising a first undivided magnetic area centrally located on said plate and second and third magnetic areas each comprising at least two spaced segments whose centers of area are equidistant from and diagonally opposed about an axis through the center of said plate extending in the direction of movement of said movable member.

10. In a multiphase magnetic incrementing drive having a stationary member and a movable member slideably mounted above said stationary member for bi-directional linear movement relative thereto, said elements having juxtaposed magnetic driving surfaces, the improvement comprising:

a. a plate mounted on the top surface of said stationary member and having formed in its upper surface at least three magnetic areas one of which is centrally located on said plate, each of said magnetic areas comprising a plurality of parallel, equally spaced lands and grooves extending in a direction transverse to the path of motion of said movable member, the lands and grooves in each one of said magnetic areas being in relative phase differential to the lands and grooves in each one of the others of said magnetic areas;

b. at least three sets of electromagnets having pole faces contacting the lower surface of said plate, the magnets of each one of said sets having a common electrical connection and being in registration and magnetic association with a different one of said magnetic areas;

c. means for selectively energizing each of said sets of electromagnets; and, d. air bearing means maintaining said movable member in floating spaced juxtaposition above said stationary member.

11. Apparatus according to claim 10 wherein said magnetic areas have a geometrical arrangement comprising: a first undivided magnetic area having its center in registration with the longitudinal center axis of the magnetic surface of said movable member, second and third magnetic areas each comprising at least two spaced segments whose centers of area are equidistant from and diagonally symmetrical about said longitudinal center axis.

12. Apparatus according to claim 10 wherein the lands and grooves in registration with a particular one of said electromagnets span the pole faces thereof.

13. A linear incrementing drive comprising:

a. a stationary member having a magnetic surface;

b. a movable member slideably mounted above said stationary member for linear movement toward and away from a work area, said movable member having a magnetic surface in spaced juxtaposition to the magnetic surface of said stationary member, a first one of said magnetic surfaces having a plurality of parallel, equally spaced lands and grooves extending in a direction transverse to the path of movement of said movable member, and a second one of said magnetic surfaces having at least three magnetic areas each comprising a plurality of lands and grooves in parallel orientation to the lands and grooves of said first magnetic surface with the lands and grooves in each one of said magnetic areas being in relative phase differential to the lands and grooves in each of the others of said magnetic areas, said magnetic areas having a geometrical arrangement comprising a first undivided magnetic area having its center in alignment with the longitudinal center axis of said movable member, and second and third magnetic areas each comprising at least two spaced segments equidistant from and diagonally opposed about said axis;

c. at least three sets of electromagnets having two pole faces contacting said second magnetic surface, the component magnets of each one of said sets having a common electrical connection and being in magnetic association with a corresponding one of said magnetic areas;

d. air bearing means maintaining said movable member in floating spaced relationship above said stationary member; and, e. means for selectively energizing each of said sets of electromagnets.

14. Apparatus according to claim 13 wherein said second magnetic surface comprises a plate having integrally formed on one surface thereof the lands and grooves of said three magnetic areas and having said electromagnet pole faces contacting the other surface thereof in registration with said magnetic areas.

15. Apparatus according to claim 14 wherein the lands and grooves in magnetic association with a particular one of said electromagnets span the pole faces thereof.

16. Apparatus according to claim 14 wherein said first magnetic surface is on said movable member and said second magnetic surface is on said stationary member.

17. An incrementing magnetic driving comprising:

a. a stationary base;

b. a movable carriage slideably mounted in superior spaced relationship to said base for relative linear movement with respect thereto toward and away from a work area;

c. a pair of magnetic plates disposed in spaced apart juxtaposition to one another, one of said plates mounted on said carriage and the other of said plates mounted on said base, a first one of said plates having formed on the surface adjacent to the second one of said plates a plurality of parallel lands and grooves extending in a direction transverse to the path of carriage movement, and the second one of said plates having formed on its surface adjacent the first one of said plates at least three magnetic areas each of said areas comprising a plurality of lands and grooves in parallel alignment with the lands and grooves of said first plate, the lands and grooves in each of said magnetic areas being in relative phase differential to the lands and grooves in each of the others of said magnetic areas;

d. air bearing means maintaining said carriage plate and said base plate in spaced relationship;

e. at least three sets of electromagnets having pole faces contacting the obverse surface of said second plate, the magnets of each one of said sets being in registration and magnetic association with a different one of said magnetic areas and having a common electrical connection; and, f. means for selectively energizing said sets of electromagnets.

18. Apparatus according to claim 17 wherein said magnetic areas have a geometrical arrangement comprising: a first undivided magnetic area having its center in alignment with the longitudinal center axis of said carriage plate, and second and third magnetic areas each comprising at least two spaced segments having centers of area equidistant from and diagonally opposed about said axis.

19. Apparatus according to claim 17 wherein the lands and grooves on said second plate in registration with a particular one of said electromagnets span the pole faces thereof.

20. Apparatus according to claim 17 wherein said first plate is mounted on said carriage and said second plate is mounted on said base.

* * * * *